United States Patent
Weissman

(12) 
(10) Patent No.: US 10,019,675 B2
(45) Date of Patent: Jul. 10, 2018

(54) ACTUALS CACHE FOR REVENUE MANAGEMENT SYSTEM ANALYTICS ENGINE

(71) Applicant: Duetto Research, Inc., San Francisco, CA (US)

(72) Inventor: Craig Weissman, San Francisco, CA (US)

(73) Assignee: Duetto Research, Inc., San Francisco, CA (US)

(*) Notice: Subject to any disclaimer, the term of this patent is extended or adjusted under 35 U.S.C. 154(b) by 101 days.

(21) Appl. No.: 14/539,164

(22) Filed: Nov. 12, 2014

(65) Prior Publication Data

US 2016/0132790 A1 May 12, 2016

(51) Int. Cl.
*G06Q 10/02* (2012.01)

(52) U.S. Cl.
CPC .................... *G06Q 10/02* (2013.01)

(58) Field of Classification Search
None
See application file for complete search history.

(56) References Cited

U.S. PATENT DOCUMENTS

| | | | |
|---|---|---|---|
| 6,892,205 B1* | 5/2005 | Colrain | G06F 17/30433 |
| 9,298,837 B2* | 3/2016 | Oztekin | G06Q 10/02 |
| 2005/0033621 A1* | 2/2005 | Hartmann et al. | 705/8 |
| 2006/0259658 A1* | 11/2006 | Connor | G06F 12/0862 710/22 |
| 2015/0006706 A1* | 1/2015 | Ellis et al. | 709/224 |

* cited by examiner

*Primary Examiner* — Tonya Joseph
(74) *Attorney, Agent, or Firm* — Lowenstein Sandler LLP

(57) ABSTRACT

At a data ingestion time, a travel sessionizer captures raw event data representing a plurality of bookings made by a plurality of users for a given day, identifies a plurality of cache entries corresponding to a travel property for the given day, wherein at least one of the plurality of bookings from the raw event data is for the travel property, and updates the plurality of cache entries corresponding to the travel property for the given data to reflect the at least one booking from the raw event data. At a runtime, the travel sessionizer receives a travel analytic query corresponding to the travel property, accesses at least one of the plurality of cache entries corresponding to the travel property for the given day, and executes the travel analytic query using travel data from the at least one of the plurality of cache entries.

15 Claims, 8 Drawing Sheets

ACTUALS CACHE FOR REVENUE MANAGEMENT SYSTEM ANALYTICS ENGINE

TECHNICAL FIELD

This disclosure relates to the field of data processing, and in particular to an actuals cache for a revenue management system analytics engine.

BACKGROUND

The travel and hospitality industry in the United States and throughout the world is an ever increasing business sector. Advances in Internet and computing technology have significantly increased the opportunities to capture data from both travelers and travel properties (e.g., hotels, motels, bed and breakfasts, condominiums, houses). For example, web site based systems are used to offer the sale and rental of many travel properties and are used to make a large percentage of travel bookings. During these bookings, a significant amount of user travel data is received. The travel data may include, for example, a destination city, specific properties, dates of arrival, length of stay, room type, property amenities, price quotes, availability information, and/or other travel information. Property owners and managers are looking for chances to use this travel data to improve decisions relating to the management and sale of units in their travel properties. The mere availability of this data, however, does not by itself improve decisions that may lead to increased profits for the travel property. Conventional revenue management systems and booking engines are not equipped to make sufficient use of the newly acquired user travel data to deliver actionable insights and analysis as needed.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
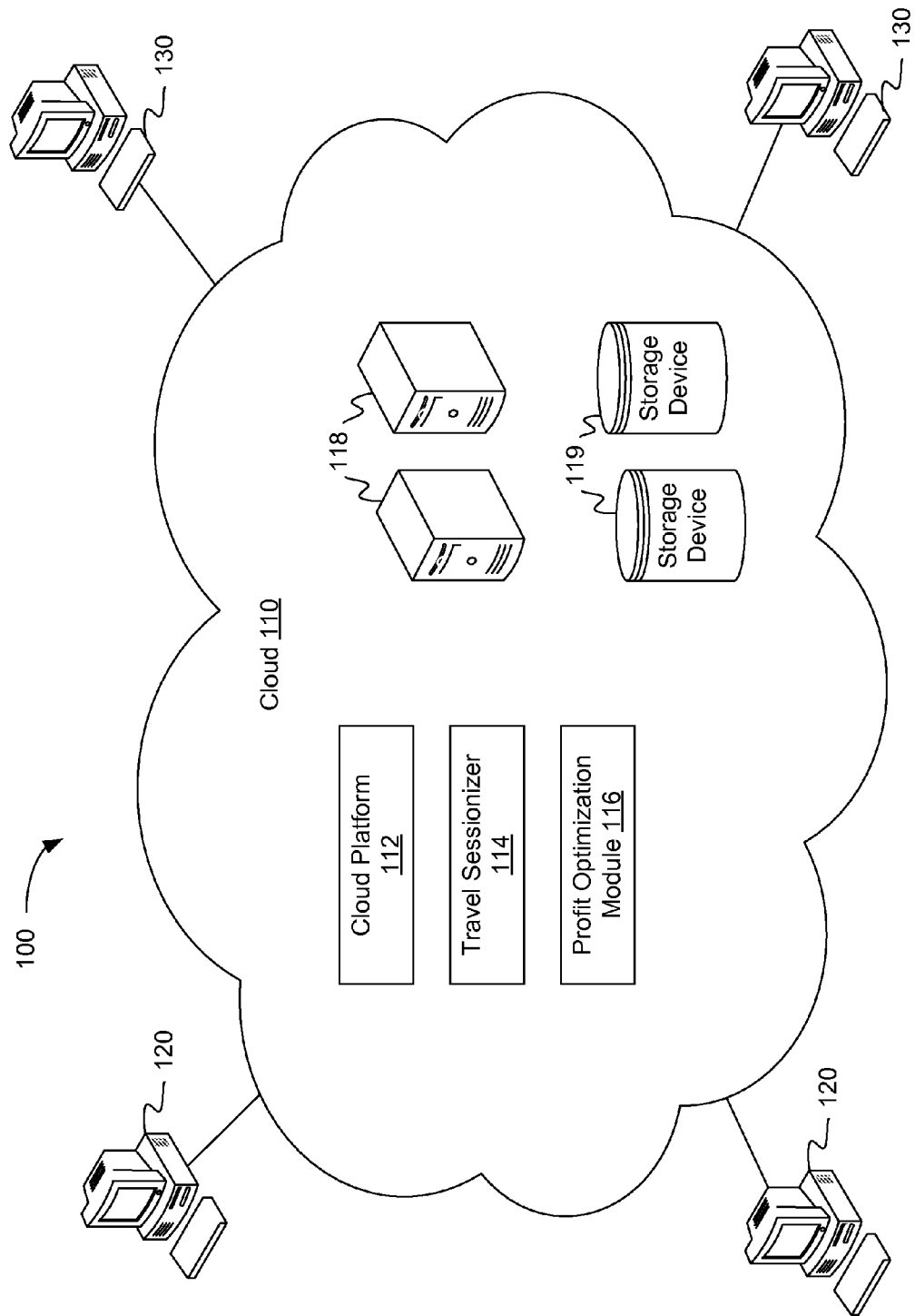
FIG. 1 is a block diagram illustrating a cloud computing environment for a multi-tenant cloud architecture, according to an embodiment.

Embodiments of a method and apparatus are described for an actuals cache for a revenue management system analytics engine. An analytic revenue management system makes use of a pipeline of data services that starts with outside source systems (e.g., customers booking travel and travel properties receiving travel bookings) and ends with new insights and results (e.g. demand forecasts and pricing recommendations) generated by the system. The outside source systems may include, for example, a property management system (PMS), which is the system of record for reservations, as well as a customer relationship system (CRS) or booking engine, which can generate shopping events such as potential bookings and denied bookings. The types of insights and outputs may include online analytical processing (OLAP) style queries (e.g., counts of bookings, sums of revenue by various dimensions), as well as non-OLAP analytics such as curves, forecasts, and intelligent pricing recommendations that may combine all of the above along with other metadata to arrive at final price recommendations by date, segment, length of stay, etc.

In one embodiment, the analytic engine may have the concept of two-dimensional dates built into the processing logic. The two-dimensional dates may include: (1) the target days of travel, as well as (2) the booking days leading up to those days and the pace implied by the relationship between these days (e.g., the difference between the day the booking was made and they day for which the reservation was made. All of these analytics may involve processing a large amounts of low-level facts (e.g., individual reservation nights) into rolled up results. These may begin with OLAP "group by" queries, but instead these results may be combined in non-OLAP ways into the results above.

Since the processing of such large amounts of data is involved, the performance of the analytics system can be improved through the use of intelligent caching. By performing certain aspects of the processing ahead of time, time can be saved later on when a specific travel analytic query is made by the user of the system. In one embodiment, the caching infrastructure utilizes a concept of "Hotel/Target-Day" as the caching granularity. The "Target Day" in question is the day of travel. Therefore, the "Hotel/Target-Day" pair represents to the business everything related to a single day of travel at one travel property (e.g., hotel, motel, bed and breakfast, condominium, house). In one embodiment, the travel property (e.g., Hotel) and the target day (also referred to herein as the travel day or day of arrival) are referred to herein as the major dimensions.

In addition to the two major dimensions (i.e., travel property and target day), there may be any number of other types of information that can be utilized as secondary or minor dimensions. In one embodiment, the more granular minor dimensions used for revenue management analysis in connection with the (Hotel, Target-Day) tuple may include customer segment, product, length of stay, booking date, or other types of information. The customer segment includes various low level input fields that are used to roll-up along this dimension including rate code, block code, market code, patron score, etc. The product usually represents the room type. This may include a sub-category of what the customer is buying: not only are they staying at the property on a specific day but they are buying a specific product, such as a Standard Room, a Deluxe Suite, etc.

Depending on the overall length of stay, different revenue management analyses may apply. For instance, the question of "how many room nights represent guests staying at least a week?" may be relevant. One way of representing this information that is useful for revenue management algorithms is an array of arrivals representing the number of guests arriving and staying for each length-of-stay. In one example, slot 1 is the number of one night stay arrivals, slot 2 is the number of 2 night stay arrivals, etc. Arrival information may be stored using this efficient array format in cache entries that include length of stay information.

The booking date, as opposed to the travel date or target date, represents the other half of the two-dimensional date concept described above. The booking date (also referred to herein as the transaction or modification date) represents the time when the booking is made or altered. This dimension can be utilized for pace or pickup analysis. For example, the analysis may include the velocity of bookings or the shape of the booking curve which shows "how far in advance does the property fill up?", etc. In one embodiment, binning booking times into days works for most travel properties, as it is sufficient to watch the pace of bookings at day-level granularity where the typical booking window has significant activity in the last 30 or 60 days before arrival. For certain properties that receive many last minute bookings, this binning can be extended to hourly or some other reasonable time increment to allow for pace analysis within the last 72 hours, for instance. The use of binning is also helpful to compress the size of cache entries.

Each of the dimensions above along with any combinations of them represent possible cubes in a NoSQL online analytical processing (NOLAP) analytical engine. As used herein, a cube is an array of data understood in terms of its dimensions. For example, one cube may include data referenced by both of the major dimensions (e.g., Hotel and Travel Day) and a subset of one or more of the minor dimensions. In one embodiment, the subset of minor dimensions may be empty. Resulting metrics (or "Facts") for certain cubes can include "Total Rooms Sold" or "Total Revenue".

In one embodiment, the analytics engine has two major code phases: ETL and runtime. During the ETL (extract, transform, load) phase, data is ingesting in the background and updates are made to the database including denormalized data downstream. At the runtime query phase, analytic queries may be run against the latest denormalized data structures which should be correct and up to date (or quite reasonably up to date) as a result of the earlier ETL processing.

In one embodiment, during the ETL phase, the system identifies any (Hotel, Target Day) tuples that have been touched (e.g., where new data has been received for either the travel property or the target day). A separate asynchronous cache "delete" message may be inserted to the proceeding queue to ensure that these old records will be deleted. Once the cache entries are deleted for those tuples, the system may enqueue an asynchronous cache warming message for each one. Cache warming refers to a process of recreating the previously deleted cache entries. Cache warming takes place to re-query and recreate the cache with the latest data. Runtime queries can then access the recreated cache entries and perform any further processing. If a runtime query needs data that is not in the cache, it can always go to the raw source data, but the results may be slower.

In order to optimize performance of the cache, the system seeks to not produce an unreasonable number of cache permutations such that there is an impractical amount of work to do at the ETL phases for delete and re-querying and to re-warm the cache fast enough that it can be used to satisfy the vast majority of interactive queries. By materializing and invalidating individual cache entries using (Hotel+Target Day+minor dimension) an optimal balance may be achieved. The (Hotel, Target Day) pair represents a middle ground that may be appropriate for high-level summary analysis. In addition, the system is able to produce tight aggregations for calculations such as "total revenue for the hotel by month" which look at daily cache values with no minor dimensions. This accelerates summary reporting across a number of days or a number of travel properties.

At the same time, the system is able to produce reasonably sized lower-level detailed cache entries that, for example, break down bookings by customer segment and by booking data. This represents a detailed/granular amount of data while still rolling up potentially thousands of reservations into an efficient compressed format. These types of cache entries maybe useful for non-OLAP revenue management analyses including generating curves and forecasting demand. Based on popular information types uses in travel analytic queries, the number of distinct permutations of the minor dimensions is not so large that there are an unreasonable number of cache entries to invalidate whenever reservations are created or changed.

FIG. 1 is a block diagram illustrating a cloud computing environment for a multi-tenant cloud architecture, according to an embodiment of the present invention. In one embodiment, cloud computing environment 100 includes cloud 110, one or more user devices 120, and one or more property devices 130. User devices 120 and property devices 130 may be used to access the resources of the cloud 110, and may include, for example, personal computers (PCs), workstations, laptop computers, tablet computers, mobile phones, personal digital assistants (PDAs) or the like. In one embodiment, user devices 120 may be personal computing devices used by individuals to shop for or browse travel properties (e.g., hotels, motels, bed and breakfasts, apartments, condominiums, houses). Property devices 130 may be computing devices used by property managers, owners, or employees to access demand forecasting, profit maximization or other resources available in cloud 110. Cloud 110 may include a group of networked computing resources accessible to the user devices 120 and property devices 130 over a network, such as a local area network (LAN), a wide area network (WAN), a global area network (GAN) such as the Internet, or a combination of such networks. The resources available in the cloud 110 may include, for example, processing devices, storage devices, applications, or other resources. The cloud 110 allows for a functional separation between the computing resources used, the user devices 120 where a user is working, and the property devices 130 where a property manager or owner is working. The cloud 110 may provide access to a vast network of computing resources and allow individuals to use data or resource intensive applications driven by cloud technology which may or may not be available locally given the limitations of the user devices 120 or the property devices 130.

In one embodiment cloud 110 includes cloud platform 112, travel sessionizer 114, profit optimization module 116, one or more application servers (or application server instances) 118, and one or more storage devices 119. Each of these resources may be located at the same location or at different locations, and may be connected to one another and/or to user devices 120 and property devices 130 through the network, as discussed above. Storage devices 119 may be, for example, memory, such as read-only memory (ROM), flash memory, random access memory (RAM), etc., or mass storage devices, such as a magnetic or optical storage devices, or a combination thereof. In one embodiment, one or more of storage devices 119 may include a NoSQL data store, such as a database. A NoSQL database can provide a mechanism for storage and retrieval of data that uses looser consistency models than traditional relational databases. Motivations for this approach include simplicity of design, horizontal scaling and finer control over availability. NoSQL databases are often highly optimized key-value stores intended for simple retrieval and appending operations, with the goal being significant performance benefits in terms of latency and throughput. NoSQL databases provide eventual consistency, where given a sufficiently long period of time over which no changes are sent, all updates can be expected to propagate eventually through the system. In one embodiment, at least a portion of the NoSQL database may be utilized as an actuals cache for the analytics processing performed by travel sessionizer 114 and profit optimization module 116. In one embodiment, certain initial processing operations may be performed at a data ingestion or ETL time by travel sessionizer 114 in order to reduce the processing time of more detailed analytic queries performed by profit optimization module 116 at a later runtime. For example, the initial processing operations may include denormalizing raw event data (e.g., user shopping data or hotel booking data) into (Hotel, Target-Day) pairs. In this format, the data may be more efficiently utilized by later analytics processes. Additional details are described below.

In one embodiment, user devices 120 and property devices 130 may interact directly with could platform 112. Cloud platform 112 may include software configured to provide access to the other resources in the cloud 110. Cloud platform 112 may cause the cloud resources, such as application servers 118 or storage devices 119, to appear, for example, as web pages or as virtual machines on user devices 120 or property devices 130.

Cloud platform 112 may pass messages between user devices 120 and property devices 130, and travel sessionizer 114 and profit optimization module 116. In one embodiment, travel sessionizer 114 captures raw event data from the travel shopping actions of users on user devices 120 and parses the raw event data into separate travel sessions. In one embodiment, a travel session includes the shopping, browsing, searching etc., done by one individual (or on one of user devices 120) for travel on a set of similar dates. For example, a travel session may include the searches performed by a user for travel over a certain weekend, or travel within several days of that weekend. The data associated with the search, including, for example, a destination city, specific properties, dates of arrival, length of stay, room type, property amenities, price quotes, availability information, and/or other travel information, may be included in a specific travel session associated with the user. Thus, the data in a give travel session is associated with a single trip. Travel sessionizer 114 may store this travel session data in the NoSQL database on one of storage devices 119 in cloud 110. If travel sessionizer 114 determines that the user makes additional searches for the same trip, travel sessionizer 114 may add any additional data to the same travel session. Additional details regarding travel sessionizer 114 will be provided below.

In one embodiment, profit optimization module 116 uses the travel session data identified by travel sessionizer 114 to forecast the demand at a given property on a certain date and determine a price for rooms at the property on that date that will increase or optimize the profit. Property managers, owners or employees using property devices 130 can access the findings of profit optimization module 116 and choose to implement the suggested prices in the sale of rooms at the property. Additional details regarding profit optimization module 116 will be provided below.

Figure 2:
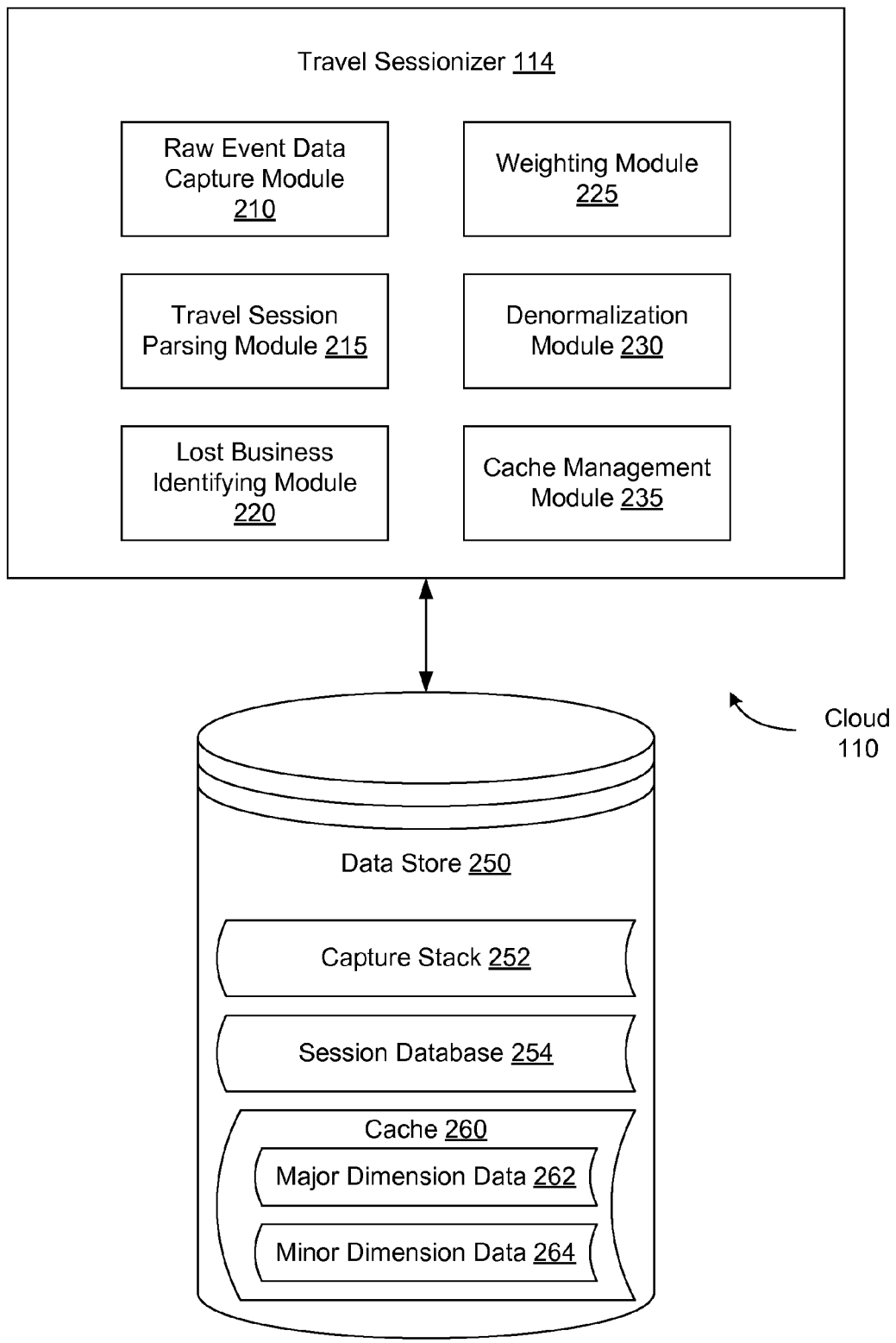
FIG. 2 is a block diagram illustrating a travel sessionizer, according to an embodiment.

FIG. 2 is a block diagram illustrating a travel sessionizer, according to an embodiment of the present invention. In one embodiment, travel sessionizer 114 may be implemented by one of application servers 118 in cloud 110, as shown in FIG. 1. In one embodiment, travel sessionizer 114 includes raw event data capture module 210, travel session parsing module 215, lost business identifying module 220, weighting module 225, denormalization module 230, and cache management module 235. In one embodiment, travel sessionizer 114 is connected to a data store 250, which may be a file system, database or other data management layer resident on a data storage device, such as one of storage devices 119, and may include a disk drive, RAM, ROM, database, etc.

In one embodiment, raw event data capture module 210 captures raw event data from users who are shopping, browsing, searching, etc. for travel on one of user machines 120. In one embodiment, a user may search for a property using a travel website running in a web browser. The web browser may use cookies or some other tracking mechanism to capture the raw event data. The raw event data may include an indication of the criteria that the user puts into each travel search. For example, the raw event data may include a destination city, specific properties, dates of arrival, length of stay, room type, property amenities, price quotes, availability information, and/or other travel information. The web browser may transmit these cookies to travel sessionizer 114 where they are received by raw event data capture module 210. In one embodiment, raw event data capture module 210 captures raw event data from properties who are accepting bookings, reservations etc., for travel using one of property machines 130. In one embodiment, a property management system (PMS), customer relationship system (CRS), booking engine, or other system receives inquires, reservations, bookings, etc. for travel to a travel property or a group of travel properties. In this embodiment, the raw event data may include an indication of the property, a travel date (or date of arrival), length of stay, room type, booking price, customer segment, and/or other booking data or information. In one embodiment, raw event data capture module 210 stores the raw event data (e.g., shopping data, booking data, or both) in a capture stack 252 in data store 250.

In one embodiment, travel session parsing module 215 parses the raw event data in capture stack 252 into individual travel sessions. In one embodiment, a travel session includes the shopping, browsing, searching, etc., done by one individual (or on one of user devices 120) for travel on a set of similar dates. For example, travel session parsing module 215 may associate all searches done from a single user device 120, with one individual. The user device 120 may be identified, for example, using a fingerprinting technique to identify a unique combination of Internet Protocol (IP) address, browser type, and/or other features associated with an individual. In another embodiment, travel session parsing module 215 may identify an individual using cookies (either first party cookies from a particular travel website, or third party cookies shared across multiple websites), or using login information (e.g., a unique identifier and password combination). The date component of the travel session may be based upon the dates for which the user is searching for travel information. For example, all searches done by the user for the same dates may be considered part of the same travel session. In one embodiment, searches done for dates that are in close proximity, but not exactly the same, may also be included in the same travel session. For example, travel session parsing module 215 may be configured with a threshold (e.g., +/−2 days) for the start and end of a trip. If the user searches for travel on dates that falls within the threshold, travel session parsing module 215 may consider that search to be part of the same travel session. In one embodiment, travel session parsing module 215 stores the travel data corresponding to each travel session in session database 254 of data store 250.

In one embodiment, lost business identifying module 220 identifies instances of lost business from the data in session database 254. Lost business may include, for example, regrets and denials. A regret occurs when an individual is offered a property on a given night for a certain price, but for some reason does not actually book the property. A denial occurs when the individual expresses an interest in booking a property of the given night, but is unable to do so, because, for example, the property is sold out or the requested room type is unavailable. Lost business identifying module 220 can analyze the shopping behaviors of an individual to determine when regrets and denials occur. Lost business identifying module 220 may add an indication of a regret or denial for a particular property to the corresponding entry in session database 254 in response to this determination.

Weighting module 225 may make a determination of the strength of a regret or denial and may assign a corresponding weighting value. For example, each of regrets and denials may be divided into different tiers, where each tier has a different weighting value. In one embodiment, with respect to denials, a first tier with a lower weighting value may include a property that was not included in a list of properties displayed to a user. A second tier, with a higher weighting value, may include a property that was specifically searched for by a user, but was sold out, and the user does not book another property on the same or similar dates. A third tier, with a highest weighting value indicating a strongest denial, may include a property thaws was specifically searched for by a user, but was sold out, and the user goes on to book another property on the same or similar dates. Weighting module 225 may add the weighting value for the regret or denial to the corresponding entry in session database 254.

In one embodiment, denormalization module 230 denormalizes the data in session database 254 to determine the number of regrets and denials for a given property on a certain day. Denormalization module 230 may read each entry in session database 254 to determine if there are any regrets or denials indicated. For each regret or denial, denormalization module 230 may increment a count value for an entry in major dimension data 262 of cache 260. In major dimension data 262, there may be a separate entry for each day at each property. The values in each entry represent the number of regrets and denials determined for the associated day at the associated property. In one embodiment, the number of regrets and denials are combined into a single count value. In other embodiments, however, each entry in major dimension data 262 may have a separate count value for each of regrets and denials. In another embodiment, denormalization module 230 denormalizes data from capture stack 252 or session database 254 to organize booking data by a certain property on a given day. Denormalization module 230 may create a tuple or other data set that includes, as its elements, indications of shopping events, booking events, or other events that correspond to the unique pair of property and travel day. Denormalization module 230 may store these tuples in major dimension data 262. Denormalization module 230 may extract other information from capture stack 252 or session database 254 including data relating to the booking segment, room type, length of stay, booking date or other factors relating to either a user shopping event or a booking event. In one embodiment, denormalization module 230 stores this information as minor dimension data 264 in cache 260.

In one embodiment, cache management module 235 controls operation of cache 260 in connection with denormalization module 230. For example, when raw event data capture module 210 receives new data, cache management module 235 may identify entries in cache 260 (from either major dimension data 262 or minor dimension data 264) that may be affected by the new data. Cache management module 235 may update those cache entries by deleting the old version of the cache entries and recreating the plurality of cache entries to reflect the newly received data. In one embodiment, this may include recreating cache entries of different granularities, including major dimension data 262 and minor dimension data 264. In one embodiment, the different cache granularities may include high-level summary cache entries (e.g., major dimension data 262) and low-level detailed cache entries (e.g., minor dimension data 264). In other embodiments, cache 260 may include data or cache entries having additional or different granularities besides those illustrated in FIG. 2.

Cache management module 235 may make a compromise between caching the perfect data for every possible runtime query, which would require vast numbers of cache entries, each requiring complex and time consuming calculations, and storing more general cache entries that can potentially be used to satisfy multiple runtime queries but are not as tightly fitted to any one specific query. For example, not all revenue management queries use both room counts and room revenue. Room revenue requires storing detailed large numeric currency values. In one embodiment, the system may produce twice the number of cache entries (i.e., those with and without this currency information). The smaller entries without the currency information could satisfy some queries faster, but the cost of storing and invalidating/recreating twice number the cache entries may not be worth the benefit. For more wide analyses, however, that potentially span many days and different travel properties more tightly fitted cache entries may be worth producing.

In one embodiment, cache management module 235 has the ability to use the second date dimension to allow for "as of" queries. Some usage patterns include running specific queries "as of" some point in time in the past. For example, one might want to test a new forecasting algorithm by ignoring everything that has happened in the last week, and instead forecasting only based on data that was known one week ago, and then seeing how that forecast compares to what really happened. To effectively go back in time, the system uses the second date dimension described above (i.e., the booking date) to use bucketed data for all days before the past as-of date but ignoring all forward booking dates. The same cache structure that allows the system to derive curve or pace information also allows for navigation backwards and asking for totals using of everything that has happened up until a certain point in time without going over that boundary.

Figure 3:
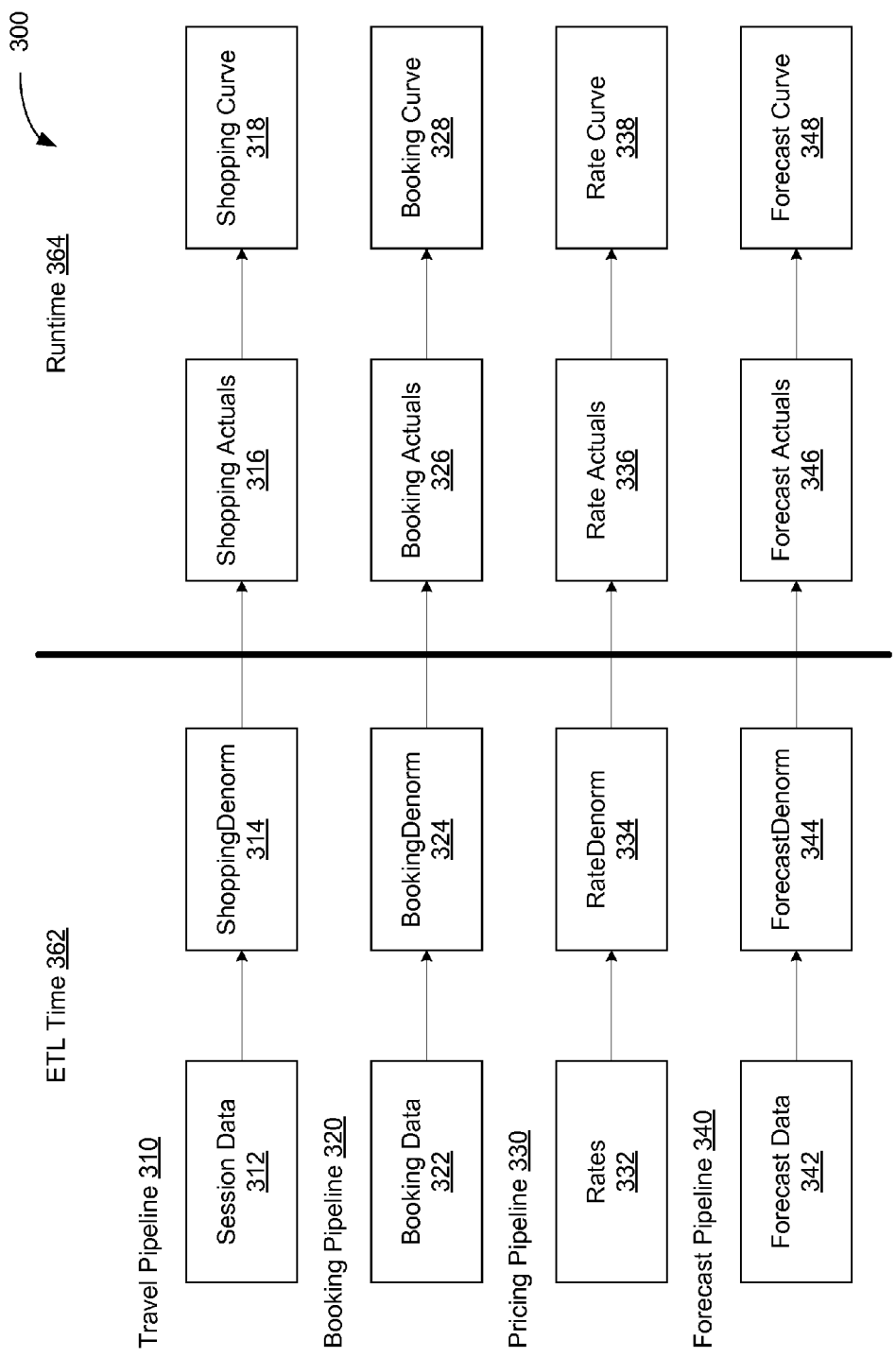
FIG. 3 is a block diagram illustrating data collection pipelines for travel sessionization, according to an embodiment.

FIG. 3 is a block diagram illustrating data collection pipelines for travel sessionization, according to an embodiment of the present invention. The various modules and components may be described in regards to their roles in collecting and analyzing data with respect to travel sessions, property bookings and prices, as well as demand or other forecasts.

In one embodiment, the processing flow 300 includes travel pipeline 310, booking pipeline 320, pricing pipeline 330, and forecast pipeline 340. In one embodiment, data in each of pipelines 310, 320, 330 and 340, as well as any other pipelines (not shown), may be processed using the same or similar sets of processing logic, instructions and algorithms. For example, other data pipelines including related travel data, such as the number and timing of cancelations for a given property, may also be similarly processed. Having the same or similar processing logic for each pipeline may simplify the operations of travel sessionizer 114, potentially saving time and/or computing resources. In one embodiment, the system not only denormalizes any source system travel event by stay date, but also stores any changes to those stay dates based on when those changes occurred (e.g., the booking or modification date).

In one embodiment, travel pipeline 310 includes session data 312, shoppingDenorm data 314, shopping actuals 316 and shopping curve 318. Travel pipeline 310, as well as all other pipelines, is also divided into two timeframes. In one embodiment, the processing of session data 312 and shoppingDenorm data 314 is performed at extract, transform, load time (ETL time) 362. ETL time 362 is the time when data is extracted from outside sources (e.g., user devices 120), transformed to fit operational needs (e.g., from raw data to session data), and loaded into the target database (e.g., shoppingDenorm data 314 in data store 250). In other embodiments described herein, ETL time 362 may also be referred to as the data ingestion time and may represent any period of time occurring prior to runtime 364. In one embodiment, the processing of shopping actuals 316 and shopping curve 318 is performed at runtime 364. Runtime 364 is the time when a user of property device 130 interacts with travel sessionizer 114 or profit optimization module 116, or a time when a scheduled task is automatically performed. In other embodiments, the processing of data in travel pipeline 310 may occur at other times. For example, shoppingDenorm data 314 may be processed at runtime 364 or shopping actuals 316 may be processed at ETL time 362 or at some other time.

In one embodiment, travel pipeline 310 begins with session data 312. Session data 312 may be data pulled from session database 254 of data store 250. As described above, travel session parsing module 215 parses the raw event data in capture stack 252 into individual travel sessions. In one embodiment, a travel session includes the shopping, browsing, searching, etc., done by one individual (or on one of user devices 120) for travel on a set of similar dates. For example, travel session parsing module 215 may associate all searches done from a single user device 120, with one individual. The date component of the travel session may be based upon the dates for which the user is searching for travel information. For example, all searches done by the user for the same dates may be considered part of the same travel session. In one embodiment, searches done for dates that are in close proximity, but not exactly the same, may also be included in the same travel session. For example, travel session parsing module 215 may be configured with a threshold (e.g., +/−2 days) for the start and end of a trip. If the user searches for travel on dates that fall within the threshold, travel session parsing module 215 may consider that search to be part of the same travel session. In one embodiment, session data 312 may include multiple sessions, and each session may include data pertaining to multiple properties and/or across multiple days (e.g., the length of the trip searched for by the session user). In another embodiment, a travel session includes bookings made by one or more individuals for one or more travel properties on a given day or a set of similar dates.

In one embodiment, session data 312 is followed by shoppingDenorm data 314. ShoppingDenorm data 314 may correspond to major dimension data 262 of data store 250. In one embodiment, denormalization module 230 denormalizes the session data 312 to organize the data, including regrets and denials, by a given property on a certain day. Denormalization module 230 may read each entry in session data 312 to determine if there are any regrets or denials indicated. For each regret or denial, denormalization module 230 may increment a count value for an entry in shoppingDenorm data 314. ShoppingDenorm data 314 may include a separate entry for each day at each property. The values in each entry represent the number of regrets and denials determined for the associated day at the associated property. Thus, shoppingDenorm data 314 is a rotated view of the same data present in session data 312, but organized by property day (i.e., a certain day at the given property) rather than by travel session (i.e., user and date range).

In one embodiment, shopping actuals 316 include known data points about each future date represented in shoppingDenorm data 314. For example, shopping actuals 316 may include the number of users who searched for travel on a given day in the future. This number may be further broken down by other categories (such as property type, location, rating, segment, etc.). The resulting shopping actuals 316 thus illustrate how many people were shopping, on a given day in the past, for travel on a given day in the future. For example, if the day of travel is November 12, the shopping actuals 316 can show the number of users who searched for travel on November 12 on the days leading up to November 12 (e.g., October 25, October 26, October 27, etc.) up until "today," (i.e., the day the processing is performed). Since shopping actuals 316 only include "actual" measured data, the actuals 316 may be limited to past days (e.g., prior to and/or including "today"). In one embodiment, the data for shopping actuals 316 may be stored in a numerical or text format. This data may be displayed to a user, upon request, in an easy to read bar or line graph, indicating the change over time.

In one embodiment, shopping curve 318 includes a forecast or prediction for future days. Shopping curve 318 may include the actual data up until "today" from shopping actuals 316, plus the forecasted demand determined by profit optimization module 116. Details of how profit optimization module 116 predicts demand, as well as other data points, are provided below. Thus, if "today" is October 30, shopping curve 318 may include the forecasted demand for travel on November 12 that will be experienced on October 31, November 1, November 2, etc., up until November 12. The data for shopping curve 318 may also be stored in a numerical or text format. This data may be similarly displayed to a user, upon request, in an easy to read bar or line graph, either with or without the data from shopping actuals 316.

As discussed above, similar processing logic, instructions and algorithms may be used for each of the remaining pipelines 320, 330 and 340. Each pipeline, however, includes different data. In one embodiment, booking pipeline 320 begins with booking data 322. The booking data 322 may be obtained, for example, from a reservations engine or a property management system (PMS) running either in cloud 110 or on one of property devices 130. The booking data 322 may include actual bookings or reservations made by a user. The booking data 322 may be rotated (e.g., by denormalization module 230) to form bookingDenorm data 324, which is organized by bookings for a given property on a certain day. Booking actuals 326 and booking curve 328 may include the actual bookings and predicted bookings, respectively, for a given day.

In one embodiment, pricing pipeline 330 begins with rate data 332. Rate data 332 may include the rates offered for a property for future days, as of a specific day (e.g., "today" or some day in the past). The rate data 332 may be obtained, for example, from the reservations engine or PMS running either in cloud 110 or on one of property devices 130. The rate data 332 may be rotated (e.g., by denormalization module 230) to form rateDenorm data 334, which is organized by day and includes the rates offered for that day by a certain property on days in the past leading up to the day of arrival. Rate actuals 336 and rate curve 338 may include the actual rates and predicted rates, respectively, for a given day at the property.

Another feature of the logic and algorithms used to process data is that they may also be used to process forecasts made by profit optimization module 116. In one embodiment, forecast pipeline 340 may begin with forecast data 342. Forecast data 342 may include the forecasted demand, bookings, prices, etc. for a property for future days, as of a specific day (e.g., "today" or some day in the past). The forecast data 342 may be obtained, for example, from profit optimization module 116, as will be described further below. The forecast data 342 may be rotated (e.g., by denormalization module 230) to form forecastDenorm data 344, which is organized by day and includes the forecasts for that day for a certain property on days in the past leading up to the day of arrival. Forecast actuals 346 and forecast curve 348 may include the actual forecasts and predicted future forecasts, respectively, for a given day at the property.

As described above, generally the actuals include actual data from days in the past and/or including data from "today" (i.e., the day the processing is performed). However, the concept of "today" may be more flexible in certain embodiments. For example, a user of property machine 130 may request to view the forecast actuals 346 and curve 348 with respect to some other date. For example, a day (e.g., September 18) from the previous month may be set as "today." As a result, the forecast actuals 346 would include that actual forecasts for the days up to and including September 18 and the forecast curve 348 would begin on September 19 and proceed into the future. This flexible concept of "today" may be similarly applied in other processing pipelines.

Figure 4:
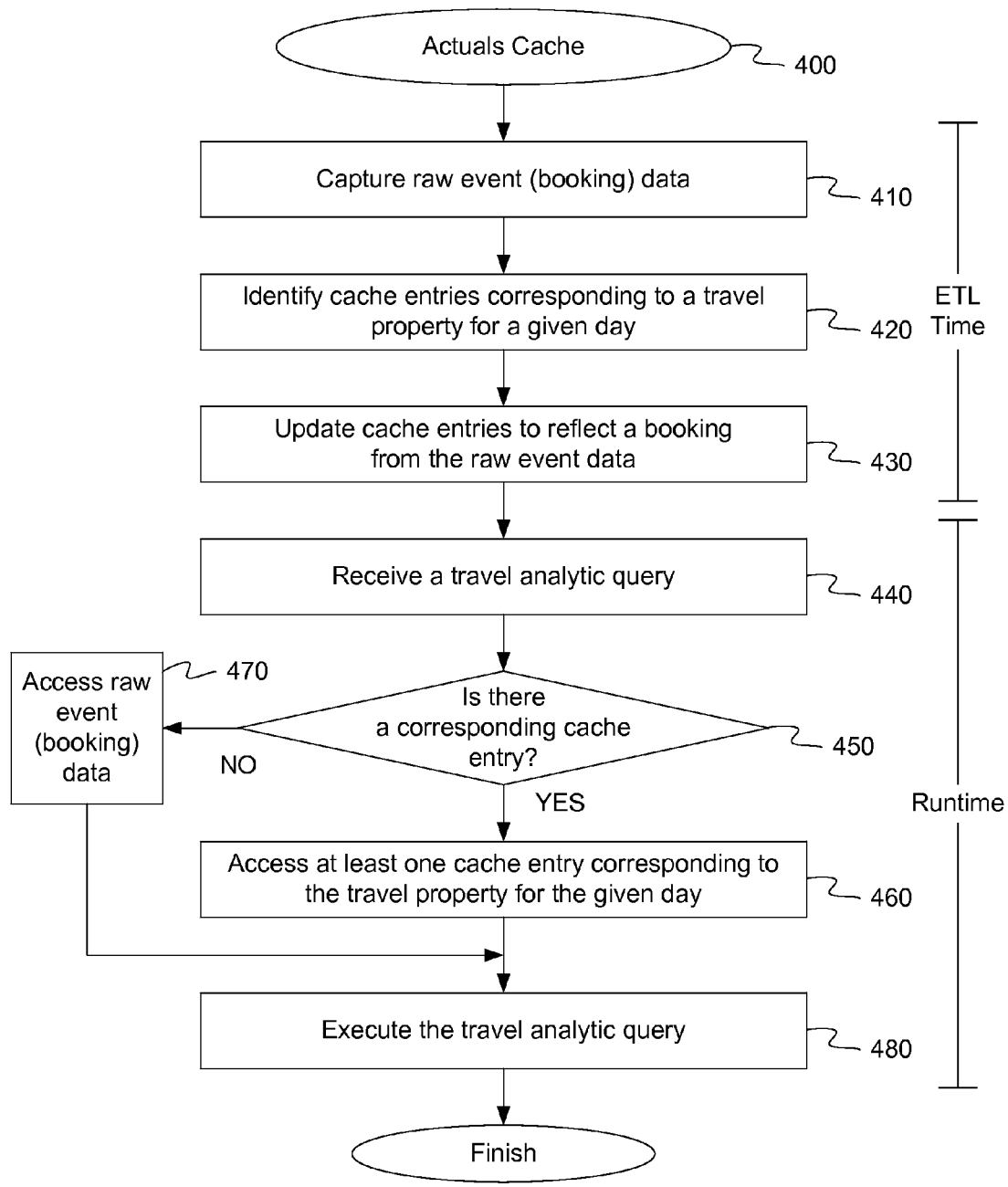
FIG. 4 is a flow diagram illustrating a method for cache management in a travel analytics engine, according to an embodiment.

FIG. 4 is a flow diagram illustrating a method for cache management in a travel analytics engine, according to an embodiment. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to implement a cache for travel data where certain initial processing operations are performed at a data ingestion or ETL time by travel sessionizer 114 and stored or cached in cache 260 in order to reduce the processing time of more detailed analytic queries performed by profit optimization module 116 at a later runtime. In one embodiment, method 400 may be performed by travel sessionizer 114 and profit optimization module 116, as shown in FIGS. 1 and 2.

Referring to FIG. 4, at block 410, method 400 captures raw event data. In one embodiment, raw event data capture module 210 captures raw event data from users who are shopping, browsing, searching, etc. for travel on one of user machines 120 or from travel properties who have received a reservation or booking for travel on one of property machines 130. If a user is searching for a property using a travel website running in a web browser, the web browser may use cookies or some other tracking mechanism to capture the raw event data. The raw event data may include an indication of the criteria that the user puts into each travel search. For example, the raw event data may include a destination city, specific properties, date of arrival, length of stay, room type, property amenities, price quotes, availability information, and/or other travel information. The web browser may transmit these cookies to travel sessionizer 114 where they are received by raw event data capture module 210. Similar data may be automatically transferred by a property management system at the travel property when a new booking is received. The received raw event data may be stored in a capture stack 252 in data store 250. In one embodiment, travel session parsing module 215 parses the raw event data in capture stack 252 into individual travel sessions. In one embodiment, a travel session includes the shopping, browsing, searching etc., done by one individual (or on one of user devices 120) for travel on a set of similar dates. In another embodiment, the travel session includes bookings made by one or more individuals for one or more travel properties on a given day or a set of similar dates. The travel data corresponding to each travel session may be stored in session database 254 of data store 250.

At block 420, method 400 identifies cache entries corresponding to a travel property for a given day. In one embodiment, where the raw event data captured or received at block 410 represents multiple bookings made by multiple different users for a given target day, cache management module 235 determines what travel properties the bookings were made for and identifies a corresponding entry from cache 260. In one embodiment, there may be at least one entry in major dimension data 262 corresponding to the (Hotel, Target day) pair identified by cache management module 235. In one embodiment, there may additionally be one or more entries in minor dimension data 262 corresponding to the (Hotel, Target day) and at least one additional minor dimension (e.g., segment, room type, length of stay, booking date).

At block 430, method 400 updates the identified cache entries to reflect a booking from the raw event data. In one embodiment, cache management module 235 deletes the cache entries identified at block 420 as they do not reflect the bookings at the travel properties from the raw event data. In one embodiment, cache management module 235 inserts an asynchronous cache delete message into an execution queue, so that the actual deletion may be performed by some other process. Once the out of date cache entries are deleted, cache management module may enqueue an asynchronous cache warming message in the execution queue in order to trigger the recreation of the cache entries, which will now reflect the bookings at the travel properties shown in the raw event data. In one embodiment, the operations from ETL time and runtime can be coordinated via a locking mechanism to ensure that race conditions do not occur since the operations may potentially be performed concurrently by different processing threads. In one embodiment, recreating the cache entries includes denormalizing the bookings made on a given day to organize the booking data by an individual property day representing booking data corresponding to the (Hotel, Target Day) pair. In one embodiment, denormalization module 230 denormalizes data from capture stack 252 or session database 254 to organize booking data by a certain property on a given day. Denormalization module 230 may create a tuple or other data set that includes, as its elements, indications of shopping events, booking events, or other events that correspond to the unique pair of property and target day. Denormalization module 230 may store these tuples in major dimension data 262. Denormalization module 230 may extract other information from capture stack 252 or session database 254 including data relating to the booking segment, room type, length of stay, booking date or other factors relating to either a user shopping event or a booking event. In one embodiment, denormalization module 230 stores this information as minor dimension data 264 in cache 260.

In one embodiment, the operations at blocks 410-430 occur at a data ingestion or ETL time. In one embodiment, the processing of session data and denormalization is performed at ETL time. ETL time is the time when data is extracted from outside sources (e.g., user devices 120), transformed to fit operational needs (e.g., from raw data to session data), and cached into the target database (e.g., data store 250). ETL time may represent any period of time occurring prior to a runtime when a travel analytic query is received. By performing at least a portion of the processing for travel analytics at an earlier time, the results of the travel analytic query may be processed faster at run time, thereby improving performance of the system.

At block 440, method 400 receives a travel analytic query corresponding to the travel property. In one embodiment, profit optimization module 116 receives a request for travel data, possibly at the instruction of a user or automated process. Profit optimization module 116 may use the requested data to perform travel analytics including for example, determining a total number of bookings for a given date, determining a total revenue over a period of time, forecasting the demand at a given property on a certain date, determining a price for rooms at the property on that date that will increase or optimize a profit, or any other travel analytic query.

At block 450, method 400 determines if there is a cache entry corresponding to the requested travel property and target day pair. In one embodiment, cache management module 235 determines which travel properties and which target days are relevant to the travel analytic query and consults major dimension data 262 in cache 260 to determine if there is a cache entry corresponding to those (Hotel, Target Day) pairs. In one embodiment, cache management module 235 also determines whether any minor dimensions are relevant to the travel analytic query and consults minor dimension data 264 to determine if there are any cache entries corresponding to the combination of (Hotel, Target Day) pairs and the minor dimensions in the request.

If there is a corresponding cache entry, at block 460, method 400 accesses at least one cache entry corresponding to the travel property for the given day. If at block 450, method 400 determines that there is not a corresponding cache entry, at block 470, method 400 accesses the raw event data captured at block 410. At block 480, method 400 executes the travel analytic query using travel data from either the corresponding cache entry or the raw travel data.

In one embodiment, the operations at blocks 440-480 occur at an analytic query runtime. Runtime is the time when a user of the analytics system requests a report or a time when a scheduled task is automatically performed. It is at this runtime when an analytic query is received requesting some underlying data in order to perform the desired analysis or generate the report. Since at least a portion of the processing operations were performed prior to the runtime, the remaining processing operations can be performed at runtime in a shorter period of time than they otherwise would have taken. Runtime may occur at any time after ETL time.

Figure 5:
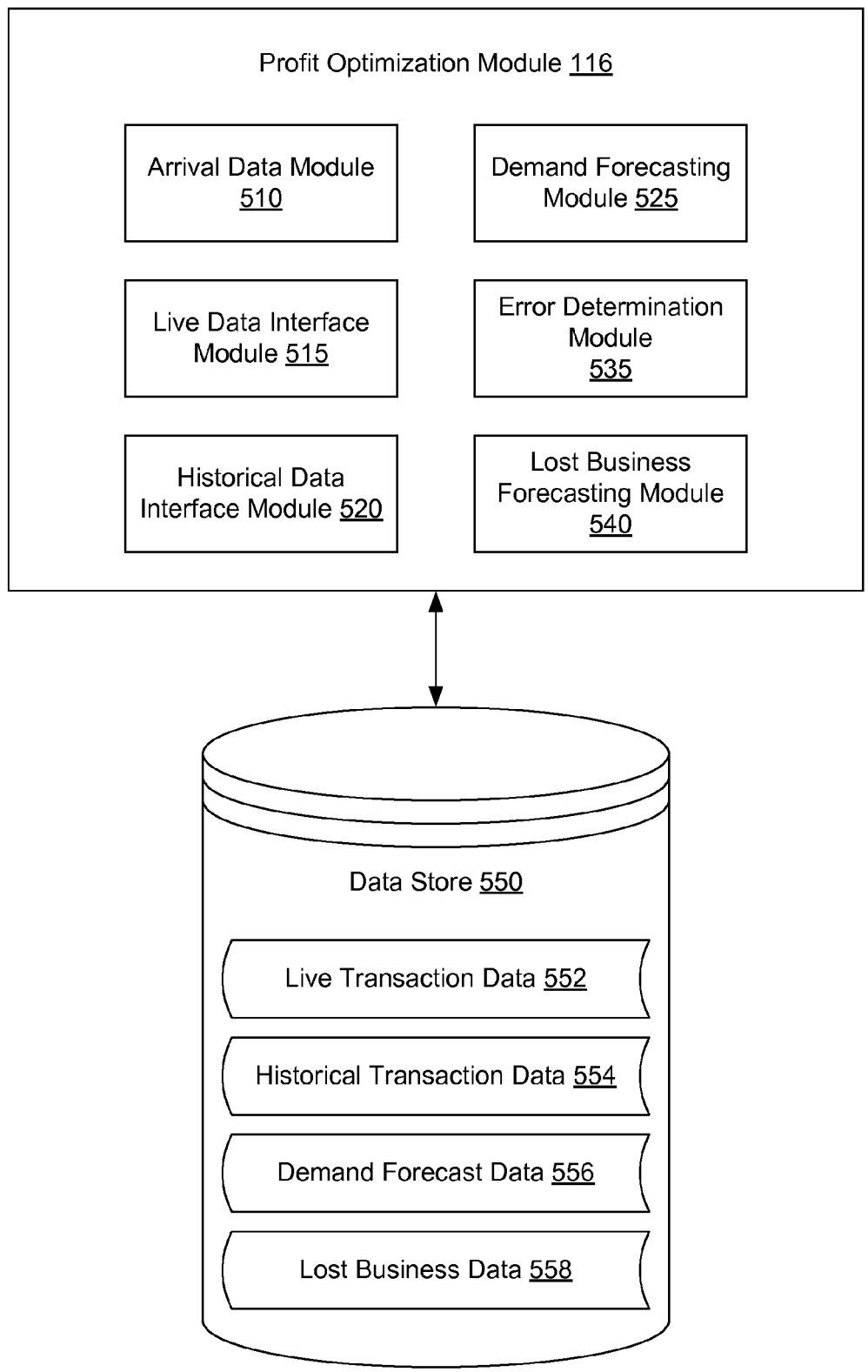
FIG. 5 is a block diagram illustrating a profit optimization module, according to an embodiment.

FIG. 5 is a block diagram of one embodiment of a profit optimization module 116 that is included in cloud 110 of FIG. 1. In one embodiment, profit optimization module 116 may include arrival data module 510, live data interface module 515, historical data interface module 520, demand forecasting module 525, error determination module 535 and lost business forecasting module 540. In one embodiment, profit optimization module 116 is connected to a data store 550, which may be a file system, database or other data management layer resident on a data storage device, such as one of storage devices 119, and may include a disk drive, RAM, ROM, database, etc. Data store 550 may include, for example, live transaction data 552, historical transaction data 554, demand forecast data 556, lost business data 558 and/or other information.

Figure 6:
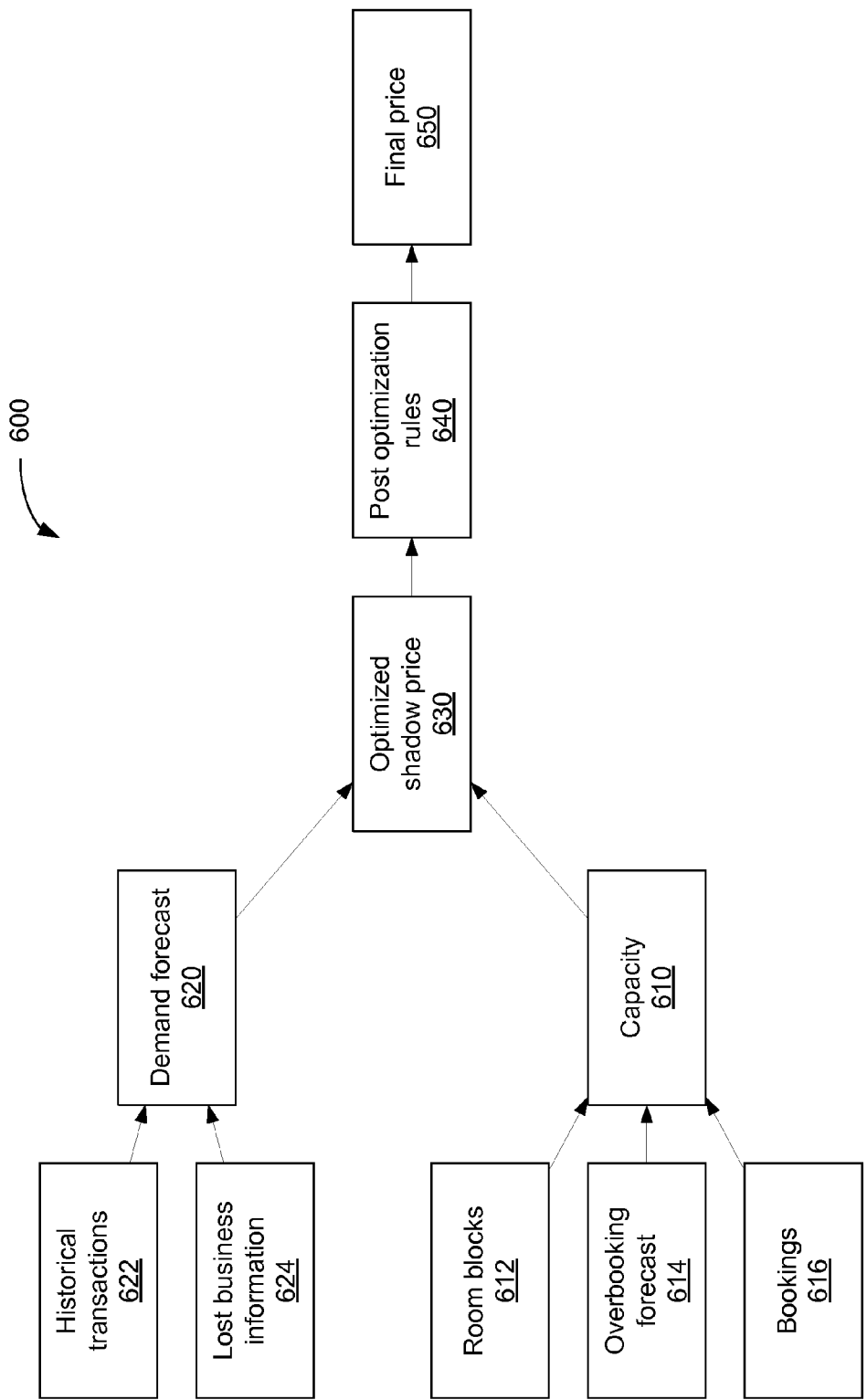
FIG. 6 is a block diagram illustrating a profit optimization processing flow, according to an embodiment.

FIG. 6 is a block diagram illustrating a profit optimization processing flow, according to an embodiment of the present invention. The various modules and components may be described in regards to their roles in determining a price for one unit of lodging (e.g., a hotel room) that will optimize the profit for the owner of the property.

In one embodiment, the processing flow 600 begins with determining a capacity for the property on a given day at block 610. In one embodiment, for ease of explanation, the day for which the capacity is determined may be referred to as the "day of arrival" or the "arrival day," although it should be understood that a guest need not necessarily arrive at the property on that day, but rather just make a reservation for that day/night. For example, the guest may have checked-in to the property on an earlier day, but their stay includes the "day of arrival." The capacity may take into account several factors including, among others, the physical number of rooms in the property, room blocks 612, an overbooking forecast 614, and previous bookings 616. Room blocks 612 may include blocks of rooms (or other lodging units) that are being held or reserved for a specific guest or group, but have not been officially booked. For example, commonly a block of rooms may be reserved for guests of a wedding or attendees of a conference, while the individuals may actually book the rooms themselves at a later date. The overbooking forecast 614 may designate a number of rooms or a percentage of rooms of the actual physical capacity of the hotel that may be booked to account for cancelations and no-shows. In one embodiment, there is a default number of rooms (e.g. 5) or a percentage of the total rooms in the property (e.g., 5%) that may be overbooked. In another embodiment, the overbooking forecast 614 may include an estimate of how many rooms to overbook based on historical trends for cancelations and no-shows. Previous bookings 616 may a number of rooms that were previously booked by guests for the day of arrival. These bookings may be subtracted from the physical capacity of the property in order to determine the capacity 610 for the property on the day of arrival. In one embodiment, room blocks 612, the overbooking forecast 614 and previous bookings 616 are obtained from a booking engine or central reservation system associated with the property. In one embodiment, at least a portion of this data, such as room blocks 612 and previous bookings 616 may be determine as part of the operations performed at ETL time and stored in the cache. Thus, when profit optimization module 116 goes to perform a travel analytic query at runtime, this information may already be available as it was calculated ahead of time.

At block 620, the demand for lodging units is forecasted for the day of arrival. In one embodiment, historical transactions 622 and lost business information 624 are combined to determine the demand forecast 620. Historical transactions 622 may include the number of bookings made at the property in the past. In one embodiment, trends may develop over time for the same day of the week. Thus, historical transactions 622 may include, for example, the number of bookings made for the same day of the week as the day of arrival during some number of previous weeks. In another embodiment, historical transactions 622 may include the number of bookings made within some period of time (e.g., 5 days) of the day of arrival during some number of previous weeks. In other embodiments, some other historical transaction data may be used. Lost business information 624 may include regrets and denials that did not result in an actual booking for the property. Regrets are generated when a potential customer searches for or inquires about a room at the property but does not ultimately book the room. Denials are generated when a potential customer is unable to book a room because either the property or the specific room type that they are searching for is sold out or otherwise unavailable on the day of arrival. This lost business information 624 can be informative of the interest in the property on the day in question and may affect the demand forecast 620. In one embodiment, historical transaction data 622 may be obtained from the booking engine or central reservation system associated with the property, and lost business information 624 may be obtained from travel sessionizer 114, as described above. In one embodiment, historical transaction data 622 and lost business information 624 may be rolled-up into the (Hotel, Target Day) pairs stored in major dimension data 264 of cache 260 at runtime. Additional details of the demand forecast 620 will be described below.

The capacity 610 and the demand forecast 620 are combined to generate the optimized shadow price 630. In one embodiment, the shadow price represents the highest price that a property can charge for an extra room at the property (and have the room be booked) based on the forecasted demand 620. For example, if the offer price for a room at the property is above the shadow price, it is unlikely that a booking will result, because the demand forecast 620 cannot support that price. If the offer price is below the shadow price, the room will likely be booked, but the property could likely have gotten a higher price for the room. If the offer price is equal to the shadow price, the property can likely optimize its profit, by obtaining a booking at the highest possible price for the extra room. In one embodiment, the shadow price is determined based on prices charged in historical transactions 622 and adjusted based on the forecasted demand. For example, if the forecasted demand is higher than the actual demand was at a certain time in the past, the shadow price may be increased from what the actual offer price was at that time in the past.

After the optimized shadow price 630 is determined, additional post optimization rules 640 may be enforced. Post optimization rules 640 can be used to vary the final price 650 from the optimized shadow price 630 according to preferences of the property owner/manager. Post optimization rules 640 may have default settings or alternatively may be controlled by the property owner/manager or by any user of the profit optimization engine. In one embodiment, price elasticity and the propensity of customers to pay a certain price, can be determined from the lost business data 624. This information can be incorporated in the post optimization rules 640 to modify the optimized shadow price 630. For example, if the shadow price 630 for the day of arrival is $100, but it is determined that customers in a specific segment are price insensitive for that day (e.g., if they are coming on business and they are on an expense account), the final price 650 can be adjusted above $100. If by looking at the data, it is determined that the customers in a segment are indifferent to paying $109 or $139 for a room (this may be seen in the data aggregated for a market), then a post optimization rule 640 for that day can modify the original $100 shadow price 630 into a $139 final selling price 650 for that segment.

In another embodiment, the post optimization rules 640 can also be based on marketing or management decisions. For example, the manager of a property may want rooms at his hotel to be priced on a specific channel at least $10 above a competing property. A post optimization rule 640 may be set to increase the final price 650 to $10 above the competitor's price for the day of arrival. Other post optimization rules 640 can deal with minimum selling rate by day of week and/or season or a maximum selling rate (e.g., the marketing department always wants to make sure the price 650 never goes below a given price or above another price). The final price 650, as modified by the post optimization rules 640 may be displayed to customers in a given segment for the day of arrival.

Figure 7:
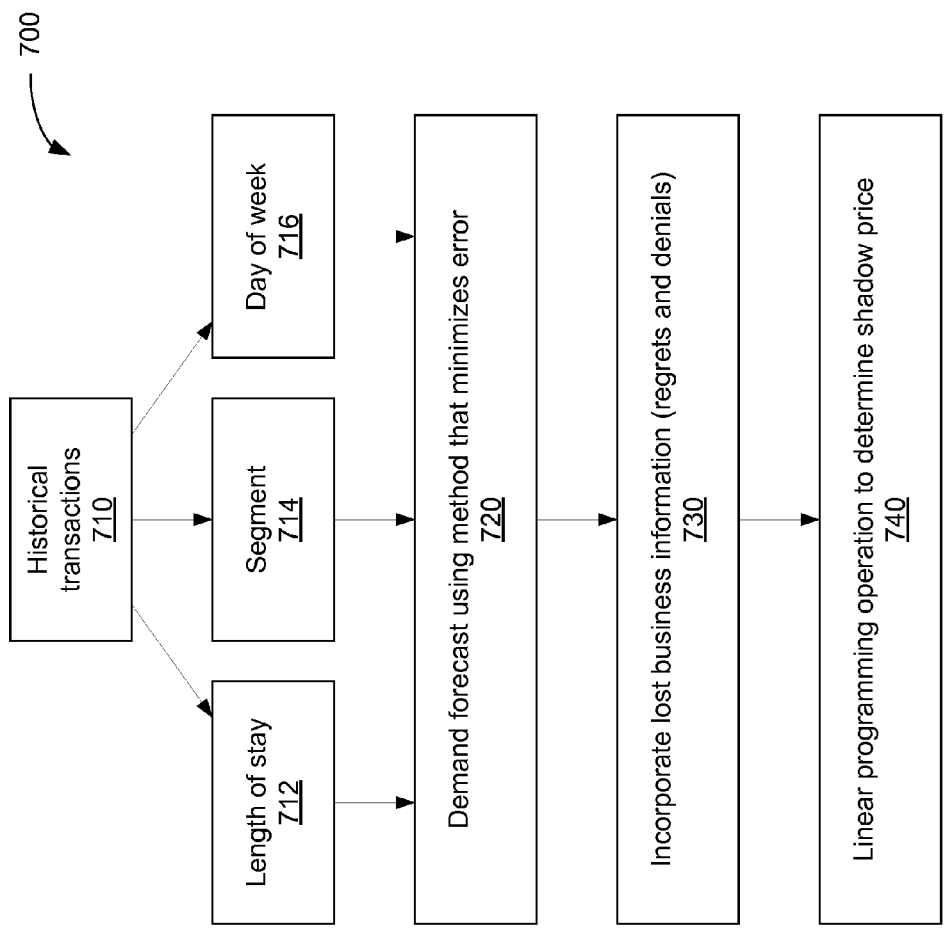
FIG. 7 is a block diagram illustrating a demand forecasting processing flow, according to an embodiment.

FIG. 7 is a block diagram illustrating a demand forecasting processing flow, according to an embodiment of the present invention. The various modules and components may be described in regards to their roles in forecasting the demand for a property on a given day in the future.

In one embodiment, the processing flow 700 begins with dividing historical transaction data 710 into a number of usable buckets. The historical transactions 710 may include information about bookings made at the property in the past. In one embodiment, historical transaction data 710 may be obtained from a booking engine or central reservation system associated with the property. The buckets into which historical transaction data 710 is divided may be groups of data that share similar characteristics. For example, one bucket may include the length of stay 712 for a booking at the property. In one embodiment, each transaction where a user books one or more consecutive nights at a property may be grouped together with other transactions booked for the same period of time (e.g., 1 night, 2 nights, 3 nights, etc.). In another embodiment, if the number of transactions in any one bucket is too low (e.g., below a defined threshold), one or more buckets may be combined. For example, if it is recognized that certain characteristics of transactions having a length of stay of 3 nights and 4 nights are similar, all of those transactions may be grouped together into a single bucket, for certain processing operations. Another bucket may include the segment 714 to which a customer belongs. Segments 714 may include groups of customers that exhibit a similar booking behavior. Examples of segments 714 may include customers that are part of a group staying at the property (e.g., for a wedding or a conference) and customers that book through a certain channel (e.g., property website, travel website, telephone, in-person). The segments 714 that make up one of the buckets may be set to default values or may be configurable by the user of the system. Another bucket may include the day of the week 716 on which the day of arrival falls. In one embodiment, trends may develop over time for the same day of the week. Thus, historical transactions 710 may include, for example, the number of bookings made for the same day of the week 716 as the day of arrival during some number of previous weeks. In another embodiment, if the number of transactions in any one bucket is too low (e.g., below a defined threshold), one or more buckets may be combined. For example, if it is recognized that certain characteristics of transactions on Tuesdays and Wednesdays are similar, all of those transactions may be grouped together into a single bucket, for certain processing operations. In another embodiment, historical transactions 710 may include the number of bookings made between the current day (i.e., the "day of forecast") and the day of arrival. The bookings made during this period of time (e.g., 5 days) during some number of previous weeks may be relevant. In other embodiments, historical transactions 710 may be divided into one or more of these buckets or other buckets not specifically described herein.

The data from each of buckets 712, 714 and 716 may be used to determine a demand forecast 720 using a method that minimizes a forecasting error. Examples of demand forecasting methods may include regression, a moving average, exponential smoothing, Bayesian, or some other forecasting method. Regression analysis may include a technique for forecasting demand based on the relationship of a number of independent variables including, for example, date, day of the week, location of the property, price of the room, or others. A moving average may include the average of a fixed sample (e.g., the bookings from a number of previous weeks) that is continuously shifted forward in time (i.e., to include only the most recent data). Exponential smoothing may include an average of the number of bookings from the past weeks that are weighted with exponentially decreasing values over time, so that the more recent data is weighted more heavily in forecasting the demand. A Bayesian average may be used to forecast the demand, but instead of estimating the average strictly from the previous booking information, other existing information related to that data may also be incorporated into the calculation in order to minimize the impact of large deviations. In one embodiment, the demand forecast 720 may be dynamically calculated using one or more of these or other forecasting methods and the forecast that is actually used may be the one that minimizes forecasting error. The forecasting error may be measured, for example, based on a median absolute deviation, a mean absolute percentage error, or by some other method.

Upon forecasting the demand 720, lost business information 730 may be incorporated into the forecast. In one embodiment, the lost business information includes regrets and denials that did not result in an actual booking for the property. Regrets are generated when a potential customer searches for or inquires about a room at the property but does not ultimately book the room. Denials are generated when a potential customer is unable to book a room because either the property or the specific room type that they are searching for is sold out or otherwise unavailable on the day of arrival. This lost business information 730 can be informative of the interest in the property on the day in question and may affect the demand forecast 720.

The result of the demand forecast 720, as affected by lost business information 730, can be used to determine the optimized shadow price 740. In one embodiment, the shadow price represents the highest price that a property can charge for an extra room at the property (and have the room be booked) based on the forecasted demand 620. In one embodiment, the shadow price is determined based on prices charged in historical transactions 622 and adjusted based on the forecasted demand.

Figure 8:
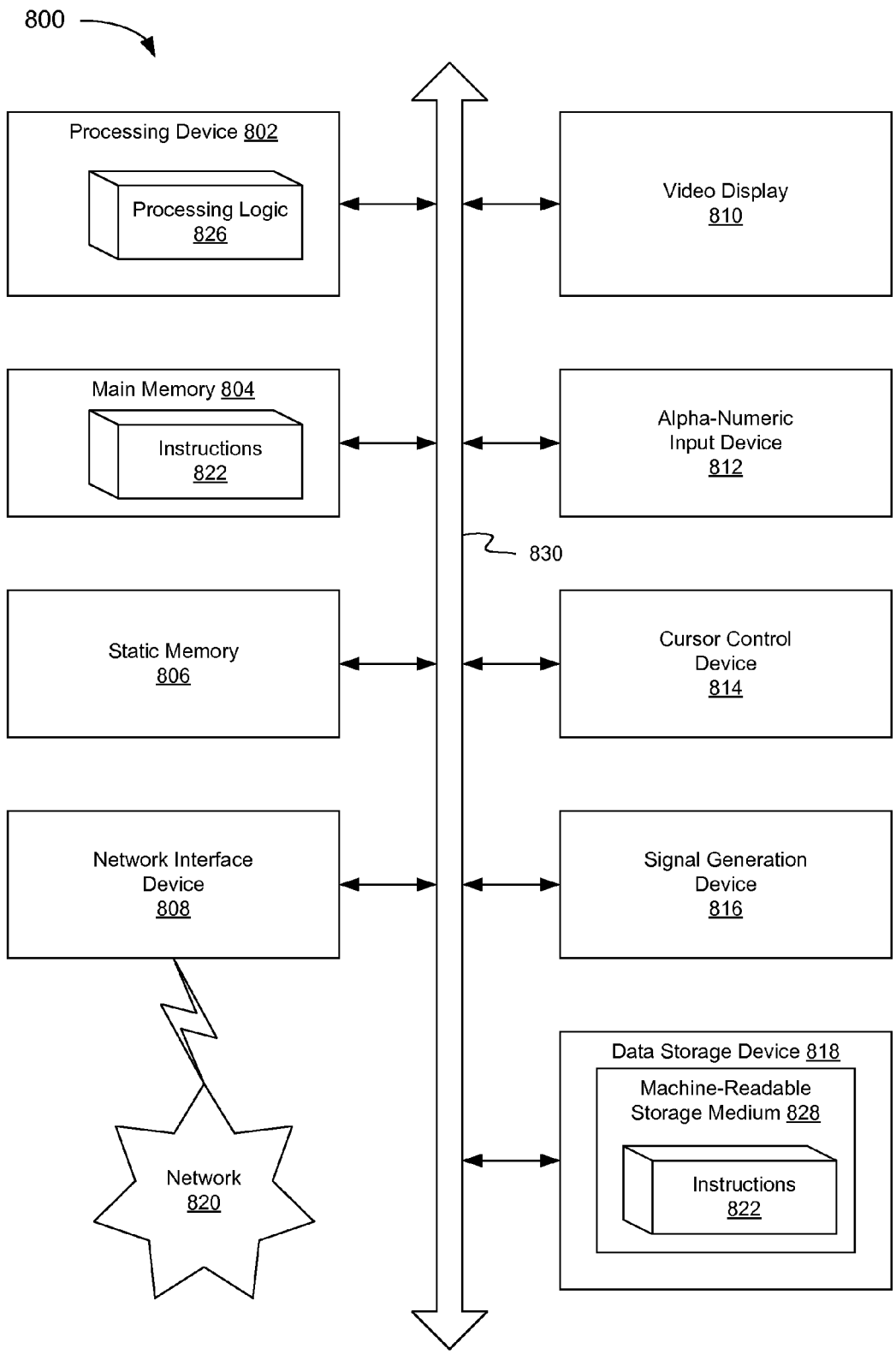
FIG. 8 is a block diagram illustrating a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as user device 120, property device 130 or a computer used to support cloud 110.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions for performing cache management in a revenue management system analytics engine, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of warming a cache comprising:
   capturing raw event data from a property device, the raw event data representing a plurality of bookings made by a plurality of users for a given day;
   identifying, by a processing device, a plurality of cache entries corresponding to a travel property for the given day, wherein at least one of the plurality of bookings from the raw event data is for the travel property, wherein the plurality of cache entries is stored in the cache, and wherein each of the plurality of cache entries comprises a different one of a plurality of cache granularities, the plurality of cache granularities comprising first cache entries comprising booking data organized by an individual property day, and second cache entries comprising the booking data organized by the individual property day and at least one of a booking segment, a room type, a length of stay or a booking date, wherein an expected type of a travel analytic query determines the one of the plurality of cache granularities corresponding to a cache entry of the plurality of cache entries;
   updating, at a data ingestion time, at least a subset of the first cache entries and the second cache entries of the plurality of cache entries corresponding to the travel property for the given data to reflect the at least one booking from the raw event data, wherein updating the first cache entries and the second cache entries at the data ingestion time decreases a processing time of a travel analytic query at a later runtime, the second cache entries representing a detailed level of data while combining a plurality booking events into each single cache entry to reduce a storage size of the cache entries in the cache;

receiving, at the runtime, the travel analytic query corresponding to the travel property;

accessing at least one of the plurality of cache entries corresponding to the travel property for the given day; and executing the travel analytic query using travel data from the at least one of the plurality of cache entries.

2. The method of claim 1, wherein updating the plurality of cache entries comprises:

deleting the plurality of cache entries not reflecting the at least one booking from the raw event data; and recreating the plurality of cache entries to reflect the at least one booking from the raw event data.

3. The method of claim 2, wherein recreating the plurality of cache entries comprises denormalizing the plurality of bookings for the given day to organize booking data by an individual property day, wherein the individual property day represents booking data corresponding to the travel property for the given day.

4. The method of claim 1, wherein the individual property day represents booking data corresponding to a travel property on a certain day.

5. The method of claim 1, wherein the travel analytic query corresponds to an analysis using raw event data comprising a plurality of bookings made by a plurality of users for a given day as of a certain point in time in the past and ignoring raw event data captured after the certain point in time.

6. A non-transitory computer-readable storage medium storing instructions for warming a cache which, when executed, cause a processing device to:

capture raw event data from a property device, the raw event data representing a plurality of bookings made by a plurality of users for a given day;

identify, by the processing device, a plurality of cache entries corresponding to a travel property for the given day, wherein at least one of the plurality of bookings from the raw event data is for the travel property, wherein the plurality of cache entries is stored in the cache, and wherein each of the plurality of cache entries comprises a different one of a plurality of cache granularities, the plurality of cache granularities comprising first cache entries comprising booking data organized by an individual property day, and second cache entries comprising the booking data organized by the individual property day and at least one of a booking segment, a room type, a length of stay or a booking date, wherein an expected type of a travel analytic query determines the one of the plurality of cache granularities corresponding to a cache entry of the plurality of cache entries;

update, at a data ingestion time, at least a subset of the first cache entries and the second cache entries of the plurality of cache entries corresponding to the travel property for the given data to reflect the at least one booking from the raw event data, wherein updating the first cache entries at the second cache entries and the data ingestion time decreases a processing time of a travel analytic query at a later runtime, the second cache entries representing a detailed level of data while combining a plurality booking events into each single cache entry to reduce a storage size of the cache entries in the cache;

receive, at the runtime, the travel analytic query corresponding to the travel property;

access at least one of the plurality of cache entries corresponding to the travel property for the given day; and execute the travel analytic query using travel data from the at least one of the plurality of cache entries.

7. The non-transitory computer-readable storage medium of claim 6, wherein to update the plurality of cache entries, the processing device to:

delete the plurality of cache entries not reflecting the at least one booking from the raw event data; and recreate the plurality of cache entries to reflect the at least one booking from the raw event data.

8. The non-transitory computer-readable storage medium of claim 7, wherein to recreate the plurality of cache entries, the processing device to denormalize the plurality of bookings for the given day to organize booking data by the individual property day.

9. The non-transitory computer-readable storage medium of claim 6, wherein the individual property day represents booking data corresponding to a travel property on a certain day.

10. The non-transitory computer-readable storage medium of claim 6, wherein the travel analytic query corresponds to an analysis using raw event data comprising a plurality of bookings made by a plurality of users for a given day as of a certain point in time in the past and ignoring raw event data captured after the certain point in time.

11. A system comprising:

a memory comprising a cache; and a processing device operatively coupled to the memory, the processing device to:

capture raw event data from a property device, the raw event data representing a plurality of bookings made by a plurality of users for a given day;

identify a plurality of cache entries corresponding to a travel property for the given day, wherein at least one of the plurality of bookings from the raw event data is for the travel property, wherein the plurality of cache entries is stored in the cache, and wherein each of the plurality of cache entries comprises a different one of a plurality of cache granularities, the plurality of cache granularities comprising first cache entries comprising booking data organized by an individual property day, and second cache entries comprising the booking data organized by the individual property day and at least one of a booking segment, a room type, a length of stay or a booking date, wherein an expected type of a travel analytic query determines the one of the plurality of cache granularities corresponding to a cache entry of the plurality of cache entries;

update, at a data ingestion time, at least a subset of the first cache entries and the second cache entries of the plurality of cache entries corresponding to the travel property for the given data to reflect the at least one booking from the raw event data, wherein updating the first cache entries and the second cache entries at the data ingestion time decreases a processing time of a travel analytic query at a later runtime, the second cache entries representing a detailed level of data while combining a plurality booking events into each single cache entry to reduce a storage size of the cache entries in the cache;

receive, at the runtime, the travel analytic query corresponding to the travel property;
access at least one of the plurality of cache entries corresponding to the travel property for the given day; and
execute the travel analytic query using travel data from the at least one of the plurality of cache entries.

12. The system of claim 11, wherein to update the plurality of cache entries, the processing device to:
delete the plurality of cache entries not reflecting the at least one booking from the raw event data; and
recreate the plurality of cache entries to reflect the at least one booking from the raw event data.

13. The system of claim 12, wherein to recreate the plurality of cache entries, the processing device to denormalize the plurality of bookings for the given day to organize booking data by an individual property day, wherein the individual property day represents booking data corresponding to the travel property for the given day.

14. The system of claim 11, wherein the individual property day represents booking data corresponding to a travel property on a certain day.

15. The system of claim 11, wherein the travel analytic query corresponds to an analysis using raw event data comprising a plurality of bookings made by a plurality of users for a given day as of a certain point in time in the past and ignoring raw event data captured after the certain point in time.

* * * * *